J. F. SOUTHGATE AND W. CAREY.
MONEY DELIVERING APPARATUS.
APPLICATION FILED MAY 12, 1922.

1,427,029.

Patented Aug. 22, 1922.
8 SHEETS—SHEET 1.

Inventors
J. F. Southgate
and
W. Carey
by
Att'y

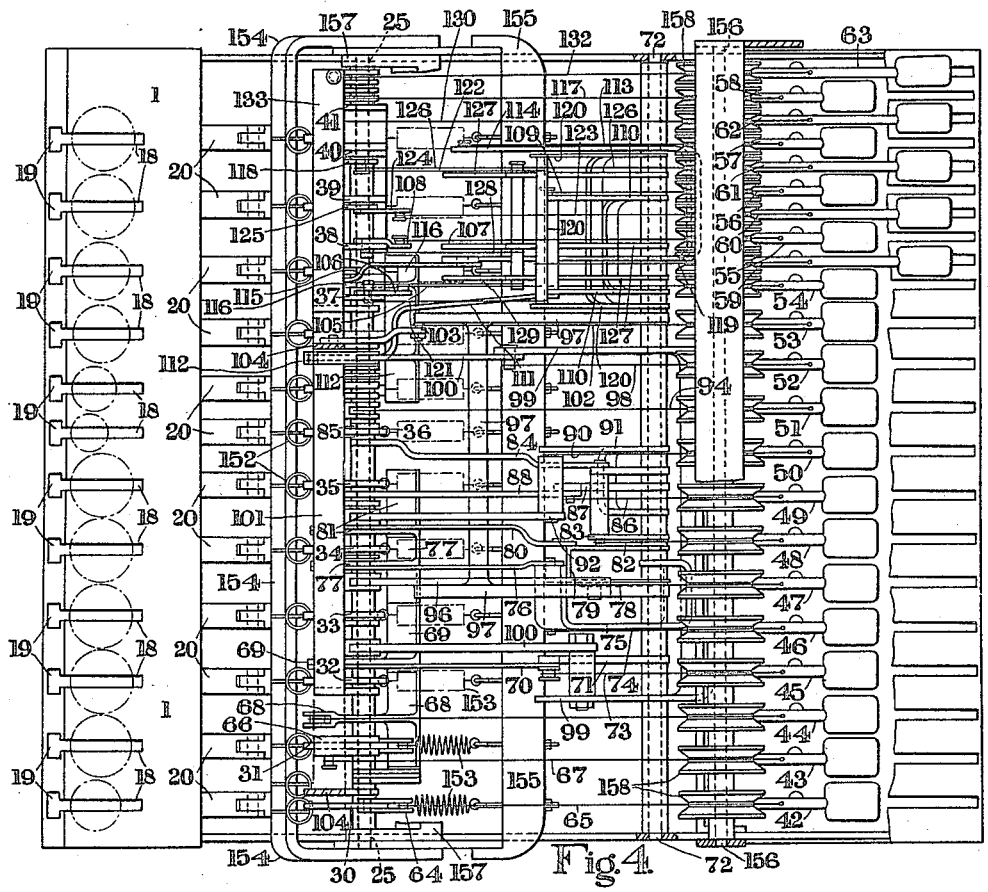

J. F. SOUTHGATE AND W. CAREY.
MONEY DELIVERING APPARATUS.
APPLICATION FILED MAY 12, 1922.

1,427,029.

Patented Aug. 22, 1922.
8 SHEETS—SHEET 3.

Inventors
J. F. Southgate
W. Carey
by
Att'y

J. F. SOUTHGATE AND W. CAREY.
MONEY DELIVERING APPARATUS.
APPLICATION FILED MAY 12, 1922.
1,427,029.
Patented Aug. 22, 1922.
8 SHEETS—SHEET 4.
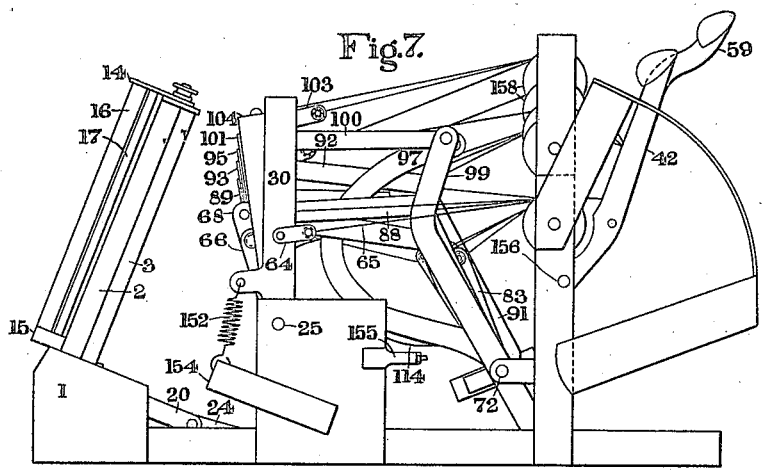
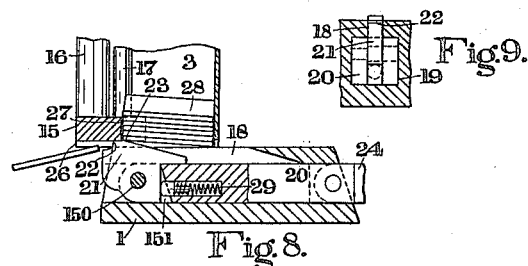
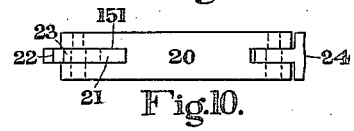
Inventors
J. F. Southgate
W. Carey
by
Att'y J. F. SOUTHGATE AND W. CAREY.
MONEY DELIVERING APPARATUS.
APPLICATION FILED MAY 12, 1922.
1,427,029.
Patented Aug. 22, 1922.
8 SHEETS—SHEET 5.
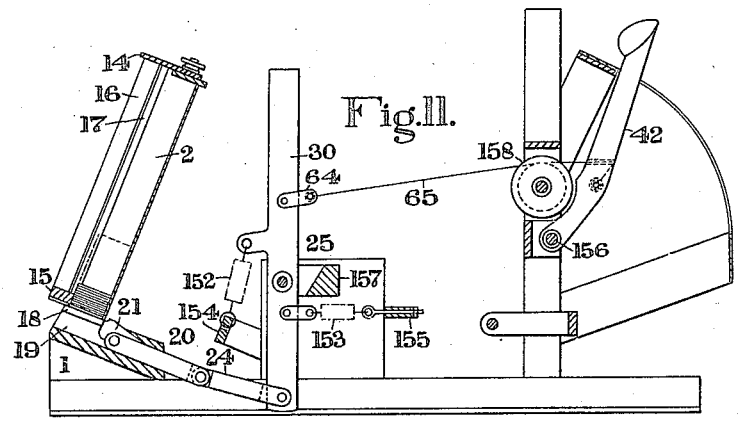
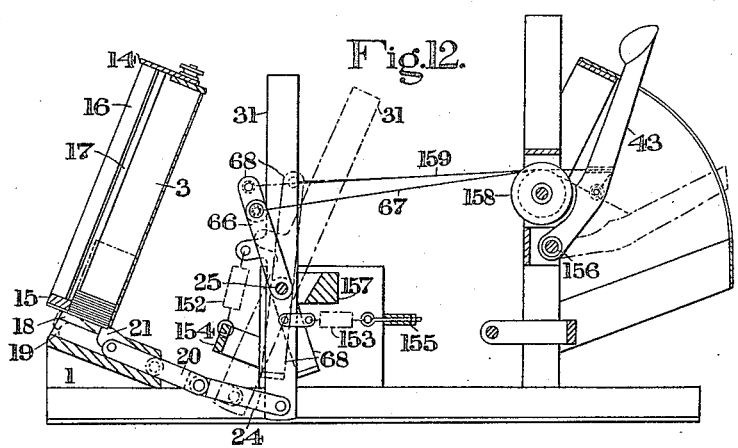
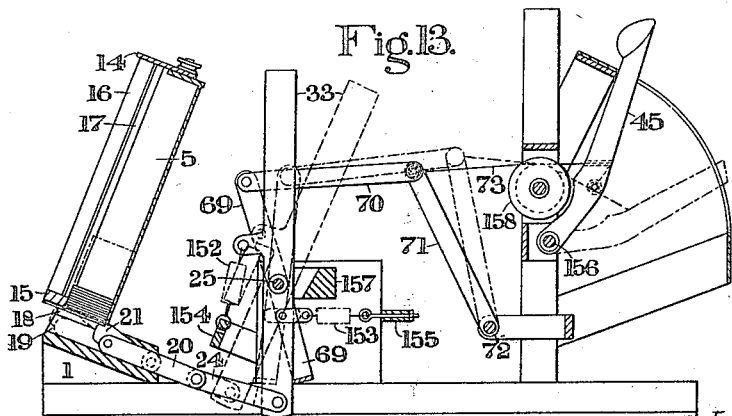
Inventors
J. F. Southgate
W. Carey
by
Att'y

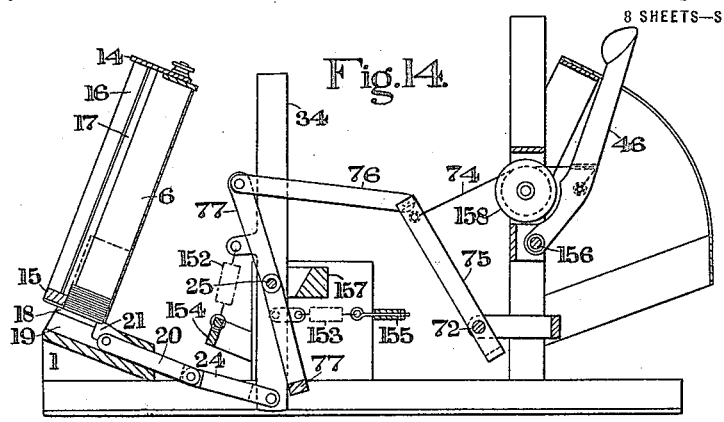
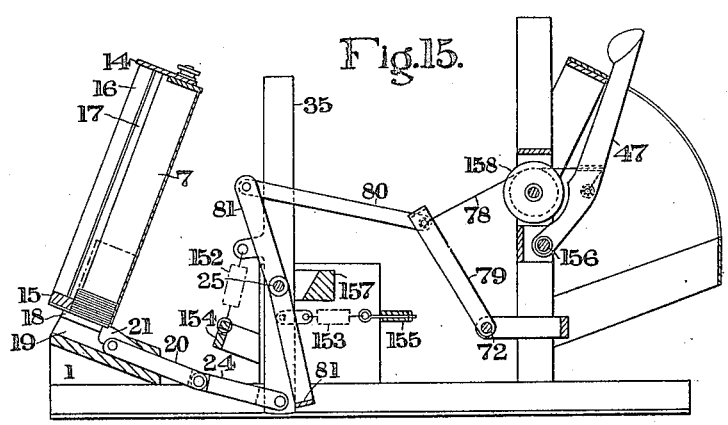
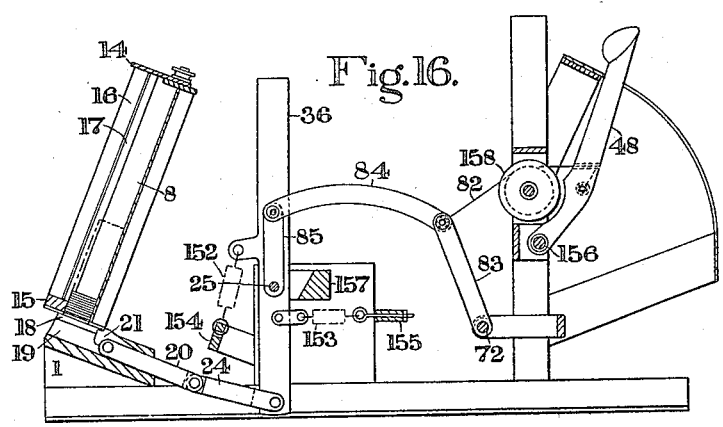

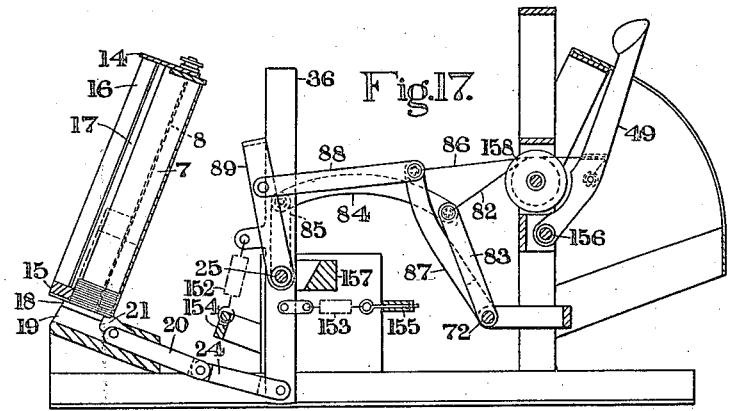

J. F. SOUTHGATE AND W. CAREY.
MONEY DELIVERING APPARATUS.
APPLICATION FILED MAY 12, 1922.

1,427,029.

Patented Aug. 22, 1922.
8 SHEETS—SHEET 8.

Inventors
J. F. Southgate
W. Carey
by
Atty

UNITED STATES PATENT OFFICE.

JAMES FREDERICK SOUTHGATE AND WALTER CAREY, OF CHELMSFORD, ENGLAND.

MONEY-DELIVERING APPARATUS.

1,427,029.  Specification of Letters Patent.  Patented Aug. 22, 1922.

Application filed May 12, 1922. Serial No. 560,305.

*To all whom it may concern:*

Be it known that we, JAMES FREDERICK SOUTHGATE and WALTER CAREY, both subjects of the King of Great Britain, residing at Chelmsford, Essex, England, have invented certain new and useful Improvements in or Relating to Money-Delivering Apparatus, of which the following is a specification.

This invention relates to coin-delivery machines and particularly to machines provided with key levers bearing characters denoting the value of the coins to be delivered by the manipulation of the key levers, which manipulation effects, automatically, the delivery of the coins of the required value from a number of receptacles in which coins of different values are stacked, the arrangement being such that the actuation of a key lever operates a coin ejector at the base of the corresponding receptacle, to eject a coin therefrom, or, in some instances, operates a group of ejectors to discharge coins from a group of receptacles, simultaneously and of a sum equal in value to that indicated on the particular key lever actuated.

According to the invention a number of ejector levers, each pivotally mounted independently and connected to a coin ejector, and a number of key levers are arranged in two rows spaced apart and the ejector levers and key levers are connected together, some directly, and other indirectly through the medium of yokes adapted to be pulled to rock the ejector levers, whereby on the depression of a single key lever either one ejector lever or a group of ejector levers is actuated to thrust an ejector or group of ejectors across the base of the corresponding chute or chutes. Each ejector comprises a plunger having a spring pressed pawl pivotally mounted at the end thereof, the plunger and pawl being completely housed and closely fitted in a coin support, extending below the coin chutes, except for a tooth on the pawl which is adapted to project above the coin support through a slot therein, on each delivery stroke of the ejector, whereby accurate and steady guiding of the ejector is ensured, the pawl having a tail bearing on the plunger during the delivery stroke to limit the upward movement of the tooth, and being of such a form that during the delivery stroke it allows the coins above it to tilt so that the coin next above that to be delivered, is raised at its forward edge above the delivery slot, whereby any tendency for it to enter that slot and escape or jam is prevented. On the return stroke, when the weight of the coin stack is taken by the coin support, the pawl spring allows the pawl to move about its pivot so that it bears lightly on the lowermost coin, in contradistinction to known coin ejector mechanism having a pivoted pawl which, by somewhat complicated devices difficult to steady and liable to become deranged, is forced away from the lowermost coin so as to return entirely out of contact therewith.

By utilizing a row of substantially upright ejector levers the yokes for operating them in groups may be advantageously mounted to engage with the ejector levers some above and some below their pivotal axes, which facilitates the grouping of the yokes and also their connection to the press-key-levers.

It also permits of the use of wires or equivalent flexible connections between the key-levers and ejector levers or yokes and in some cases between the yokes and the ejector levers.

In order to avoid inaccurate delivery of coins, due to the operator being unaware that one or more of the coin chutes is emptied, a dummy, thicker than a coin, may be inserted in each coin chute, and the ejector of that particular chute is adapted to engage, in such circumstances, with the dummy therein, so that the press-key-lever, appertaining thereto, or to any group including that chute, is locked against depression.

A machine according to the invention, and adapted to deliver coins either singly or in sums varying in value from ½d. to £1 is hereinafter described by way of example with reference to the accompanying drawings, wherein:

Figure 4 is a sectional plan view of the machine, the coin chutes and the guide frame being omitted for clearness.

Figure 7 is a side view of the machine.

Figure 8 is a side sectional elevation of one of the ejectors drawn to an enlarged scale.

Figure 9 is a front view thereof: and

Figure 10 is a plan view of said ejector.

Figure 1:
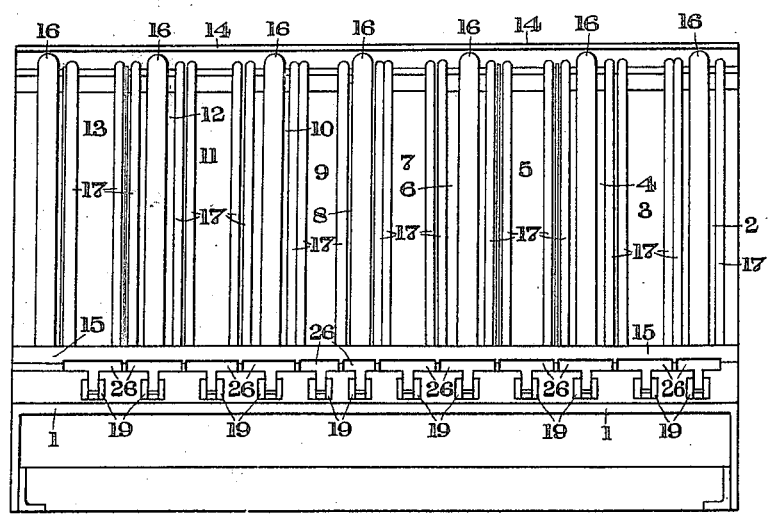
Figure 1 is a front view of the machine.
Figure 3:
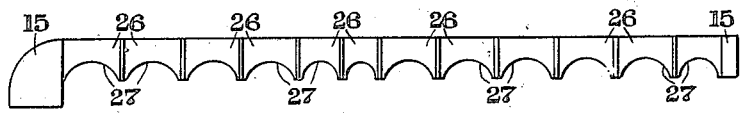
Figure 3 is an underside plan view of the coin support.
Figure 2:
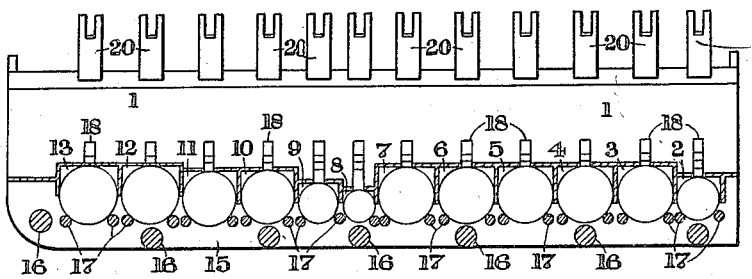
Figure 2 is a sectional plan view of the coin chutes and the guide frame.

Figures 11 to 22 inclusive are side sectional elevations illustrating the mechanism for ejecting coins of various values as hereinafter specified.

Like reference numerals indicate corresponding parts in the several figures.

The machine illustrated is fitted with 22 press-key levers, marked in the following order:—½d., 1d., 2d., 3d., 4d., 5d., 6d., 7d., 8d., 9d., 10d., 11d., 1/—, 2/—, 3/—, 4/—, 5/—, 6/—, 7/—, 8/—, 9/—, 10/—, and there are 12 coin chutes arranged in the following order:—½d, 1d., 1d., 1d., 1d., 1d., 6d., 1/—, 2/—, 2/—, 2/6, 2/6.

In the machine illustrated a coin support 1 extends across the front part of the machine, and inclined coin chutes 2, 3, 4, 5, 6, 7, 8, 9, 10, 11, 12, 13, and a guide frame are provided above said support. The guide frame, which is detachably mounted, comprises a top plate 14 and a bottom plate 15 connected together by rods 16 and guide rods 17, Figures 1 to 3 and 7 to 11, the coin chutes being stacked with coins in the following order, viz:—chute 2 receives halfpennies, chutes 3 to 7 receive pennies; chute 8 receives sixpenny pieces; chute 9 receives shillings; chutes 10 and 11 each receive two shilling pieces; whilst chutes 12 and 13 each receive half crowns.

A coin ejector is provided below each coin chute and comprises a plunger 20, provided at its forward end with a pawl 21, Figures 8, 9, and 10. The plunger 20 which is preferably of rectangular cross-section accurately fits the slideway 19 of corresponding section so that while it can slide freely it is firmly steadied against lateral movement. A substantial portion of the pawl 21 fits in a slot 151 in the forward end of the plunger 20, so that the pawl, although free to move about a pivot pin 150, has a large lateral bearing surface and is thus firmly held against lateral movement.

The pawl 21 extends upwardly through a slot 18 in the coin support 1 and has a tooth 22 and a rearwardly and downwardly sloped tail 23, which, during the forward stroke of the ejector, engages with the top of the plunger 20 thereby limiting the upward movement of the pawl 21 and consequently determines the maximum height of the tooth 22. A spring pressed plunger 29 tends to hold the pawl in this position. From the above description it will be clear that each plunger 20 and its pawl 21 are completely housed in the coin support 1 except for the tooth 22 which projects above the coin support 1, during the forward stroke, sufficiently to allow the front of the tooth 22 to engage with the rear edge or rim of the lowermost coin in the chute and thereby to eject said coin through the delivery slot 26 in the under surface of the bottom plate 15. While the lowermost coin is being ejected the next coin of the stack of coins above bears on the top of the tooth 22 and, as this tooth moves past the centre of this coin, the stack of coins tends to fall and owing to the slope of the tail 23 there is sufficient clearance to allow the stack of coins to tilt about the top of the tooth 22 as a fulcrum. Immediately this tilting occurs the forward edge of the next coin above that being ejected is raised well above the delivery slot 26 so that any tendency for this coin to enter that slot and escape or jam is avoided. When the lowermost coin has been ejected and the ejector begins to make its return stroke, the pawl 21 moves about its pivot pin 150 against the action of the spring plunger 29, so that the tooth 22 is pressed into the slot 18 and rubs but lightly against the lowermost coin with very little friction. As soon as the tooth 22 passes beyond the rear of the lowermost coin the spring plunger 29 returns the pawl to its initial position with the front of the tooth ready to engage with that coin. A dummy 28 of greater thickness than that of a coin, may be placed on top of the stack of coins so that when the last coin of the stack has been ejected further operation of the ejector is prevented owing to the engagement of the tooth 22 with the rear edge of the dummy, the front edge of which bears against the inner surface 27 of the bottom plate 15.

Each plunger 20 is connected by a link 24 to the lower end of a substantially upright ejector lever. These ejector levers 30, 31, 32, 33, 34, 35, 36, 37, 38, 39, 40, and 41, are arranged in a row behind the row of coin chutes 2. Each ejector lever is independently mounted on its pivotal axis, for example they are all mounted freely on a stationary axle 25. Each has springs 152 and 153 which tend to hold it substantially upright with the connected ejector plunger 20 in its initial position. The free ends of the springs 152 are fixed to a common frame 154 extending across the machine, while the free ends of the springs 153 are adjustably connected to a common frame 155 also extending across the machine, such adjustable connection enabling the tension of the springs 153 to be varied, and consequently the position of the ejector levers to be adjusted for ensuring accuracy in the initial position of the pawls 21. A stop bar lever 157 is provided for the ejector levers.

A number of key levers numbered 42 to 63 inclusive are arranged in a row and each independently mounted on its pivotal axis, for example they are all freely mounted on a stationary axle 156 which is in spaced relation to the stationary axle 25.

Except for three of the ejector levers, which correspond to three chutes containing respectively halfpenny, one penny and sixpenny pieces and which ejector levers it is required sometimes to actuate independently for the delivery of a single coin, all the ejector levers are indirectly operated by key levers through the medium of yokes so that the ejector levers are worked in groups, as hereinafter more fully described with reference to each particular example. The yokes are independently and freely mounted on the stationary axle 25, some extending above and the others below this axle, but all being adapted to be pulled against the ejector levers by depression of key levers to move the ejector levers about the axle 25 to push the corresponding ejectors across the bottoms of the corresponding coin chutes. The connections between each key lever and its ejector lever and the operation of the connected parts will now be described in detail.

Referring to Figures 4, 5, 6, 7, and 11 illustrating the mechanism for delivering ½d. the ejector lever 30 is directly connected to the key lever 42 by means of a shackle 64 and a wire 65, passing over a guide pulley 158 so that a depression of the key lever 42 results in the actuation of the ejector lever 30 alone to effect a delivery of a ½d. from the corresponding coin chute 2.

In order that a penny coin alone may be delivered, the ejector lever 31, Figures 4, 5, 6, and 12, is not directly connected to its key lever 43 which is connected by a wire 67 to a forked lever 66 freely pivoted on the axle 25 and adapted to be pulled against the ejector lever 31 when the key lever 43 is depressed.

The simultaneous delivery of two pennies is effected by the depression of the key lever 44 which lever is connected by a wire 159 to a T shaped yoke 68 freely mounted on the axle 25 and extending below the same, so that it is pulled against the two ejector levers 31 and 32, and rocking the same causes the ejectors connected therewith to eject a penny from each of the two chutes 3 and 4.

For the delivery of 3d. the depression of the key lever 45, Figures 4, 5, 6, and 13, effects the simultaneous ejection of a penny from each of the coin chutes 3, 4, and 5. A link 71 is pivoted on a fixed fulcrum 72 and is pivotally connected to a link 70 connected to a yoke 69 freely mounted on the axle 25, and adapted to be pulled against the lower ends of the three ejector levers 31, 32, 33, by a depression of the key lever 45 which is connected by a wire to the link 70.

For the delivery of 4d. the key lever 46, Figures 4, 5, 6, and 14, is connected to the ejector lever 34 through the intermediary of wire 74, lever 75, pivotally mounted on the fulcrum rod 73, link 76 and yoke 77 pivotally mounted on fulcrum rod 25, the yoke 77 being of greater length than the yoke 69 so as to swing below it and on the depression of the key lever 46 to engage simultaneously with the ejecting levers 34, 33, 32, 31, and thus through their ejectors 20 eject 1d. from each of the chutes 6, 5, 4, 3.

For the delivery of 5d. Figures 4, 5, 6, and 15, key lever 47 is connected by the wire 78, lever 79 pivoting on fulcrum rod 72, link 80, yoke 81, the yoke 81 being of greater length than the yoke 77 so as to swing below it to engage simultaneously with the ejector levers 35, 34, 33, 32, 31, and through their ejectors 20 to eject 1d. from each of the coin chutes 7, 6, 5, 4, 3.

For the delivery of 6d. that is to say a sixpenny piece, Figures 4, 5, 6, and 16, key lever 48 is connected by a wire 82, levers 83 pivoting on the fulcrum rod 72, link 84 and lever 85 pivoting on fulcrum rod 25 but fixedly connected to the ejector lever 36, so that on depression of the key lever 48, said ejector lever 36 is rocked on its fulcrum 25 and by its ejector 20 ejects a sixpenny piece from the coin chute.

For the delivery of 7d. that is to say a sixpenny piece and a penny, Figures 4, 5, 6, and 17, the key lever 49 is connected by a wire 86, lever 87 pivoting on fulcrum rod 72, and link 88 to yoke 89 pivotally mounted on fulcrum rod 25, and extending across and in front of the ejector levers 36, 35, so that on depression of the key lever 49 both the ejector levers 36, 35, are rocked, whereby the ejector 20 of ejector lever 36 ejects a 6d. piece from chute 8, whilst the ejector 20 of ejector lever 35 ejects 1d. from the chute 7.

For the delivery of 8d. Figures 4, 5, 6, and 18, key lever 50 is connected by the wire 90, lever 91 pivoting on fulcrum rod 72 and link 92 to a yoke 93 pivoting on fulcrum rod 25 and extending across and in front of the ejector levers 36, 35, 34, so that on depression of key lever 50, said levers 36, 35, 34 are rocked, causing, through their ejectors 20, the ejectment of a 6d. piece from chute 8 and 1d. from each of the chutes 7 and 6.

For the delivery of 9d. Figures 4, 5, 6, and 19, the key lever 51 is connected by wire 94 to a yoke 95 pivoting on fulcrum rod 25, the yoke 95 being connected by a link 96 to a lever 97 pivoting on the fulcrum rod 72. The yoke 95 is adapted to engage with the ejector levers 36, 35, 34, 33, so that on actuating depression of the key lever 51, the ejector levers 36, 35, 34, 33 are rocked simultaneously and through their ejectors 20 eject a 6d. piece from chute 8, and 1d. from each of the chutes 7, 6, 5.

For the delivery of 10d. Figures 4, 5, 6, and 20, the key lever 52 is connected by a wire 98 to a lever 99 pivoting on the fulcrum rod 72, and by links 100 to a yoke 101 pivoting on the fulcrum rod 25, the yoke 101 extending in front of the ejector levers 36, 35, 34, 33, 32, so that on depression of the key lever 52, the ejector levers 36, 35, 34, 33, 32, all rock together and by means of their ejectors 20 eject a 6d. piece from chute 8, and 1d. from each of the chutes 7, 6, 5, 4.

For the delivery of 11d. Figures 4, 5, 6, and 21, the key lever 53 is connected by a wire 102 and shackle 103 to a yoke 104 pivoting on the fulcrum rod 25, so that on depression of the key lever 53, the yoke 104 which extends in front of the ejector levers 36, 35, 34, 33, 32, 31, is rocked and with it all said ejector levers, which by means of their ejectors 20, eject a 6d. piece from chute 8, and 1d. from each of the chutes 7, 6, 5, 4, 3.

For the delivery of 11½d. the key lever 53 is first actuated effecting the ejectment of the 11d. as above described and then the key lever 42 is actuated, effecting the ejectment of the ½d. from coin chute 2.

For the delivery of 1/— piece, Figures 4, 5, 6, and 22, the key lever 54 is connected by a wire 105 and a shackle 106 to the ejector lever 37, so that on depression of the key lever 54, the lever 37 is pulled and the ejector 20 thereof ejects a 1/— piece, from coin chute 9.

For the delivery of a 2/— piece, Figures 4, 5, 6, and 22, the key lever 55 is connected by a wire 107 and a link 108 to the ejector lever 38, so that on depression of the key lever 55, the ejector lever 38 is pulled and by it the ejector 20 ejects a 2/— piece from the coin chute 10.

For the delivery of 3/—, Figures 4, 5, 6, and 22, the key lever 56 is connected by a wire 109 to a lever 110, pivoting on the fulcrum rod 72, and a link 111 connected to the upper end of a yoke 112, pivoting on the fulcrum rod 25, the yoke 112 extending across the back edges of the ejector levers 37 and 38, so that on depression of the key lever 56, the yoke 112 rocks said ejector levers 37 and 38, effecting, through their ejectors 20, the ejection of a 2/— piece from chute 10 and a 1/— piece from chute 9.

For the delivery of 4/—, Figures 4, 5, 6, and 22, the key lever 57 is connected by a wire 113, a lever 114 pivoting on the fulcrum rod 72 and by a link 115 to a yoke 116 pivoting on the fulcrum rod 25, the yoke 116 being longer than the yoke 112 so as to swing below the same, engages with the rear of the ejector levers 39, and 38, so that on depression of the key lever 57, both ejector levers 39, 38 are rocked simultaneously and by their ejectors 20 eject a 2/— piece from each of the coin chutes 11 and 10.

For the delivery of 5/— Figures 4, 5, 6, and 22, the key lever 58 is connected by a wire 117 to a yoke 118, pivoting on the fulcrum rod 25 and extending in front of the ejector levers 40, 41, so that on depression of the key lever 58, the ejector levers 40, 41, are rocked simultaneously, and through their ejectors 20, eject a 2/6 piece from each of the coin chutes 12 and 13.

For the delivery if 6/— Figures 4, 5, 6, and 22, the key lever 59 is connected by a wire 119 to a yoke 120 pivoting on the fulcrum rod 72, the yoke 120 being connected by a wire 121 to the ejector lever 37 and by a wire 122 with the yoke 118, so that on depression of the key lever 59, the ejector levers 41, 40 and 37 are rocked simultaneously, ejecting, by means of their ejectors 20, a 2/6 piece from each of the coin chutes 13 and 12 and a 1/— piece from the coin chute 9.

For the delivery of 7/—, the key lever 60 is connected by a wire 123, and a link 124 to a yoke 125, pivoting on the fulcrum rod 25, the yoke 125 extending in front of the ejector levers 41, 40, 39, so that on depression of the key lever 60, the ejector levers 41, 40, 39, are rocked simultaneously, and by means of their ejectors 20, eject a 2/6 piece from each of the coin chutes 13 and 12, and a 2/— piece from coin chute 11.

For the delivery of 8/—, Figures 4, 5, 6, and 22, the key lever 61 is connected by a wire 126 to a yoke 127, pivoting on the fulcrum rod 72, and to a lever 118, the yoke 127 being connected by wires 128 and 129, Figure 4, to the ejector levers 38 and 37 respectively, the depression of the key lever 61 causing the ejector levers 41, 40, 38 and 37 to rock simultaneously and through their ejectors 20 to eject a 2/6 piece from each of the coin chutes 13 and 12, a 2/— piece from chute 10, and a 1/— piece from the coin chute 9.

Figure 5:
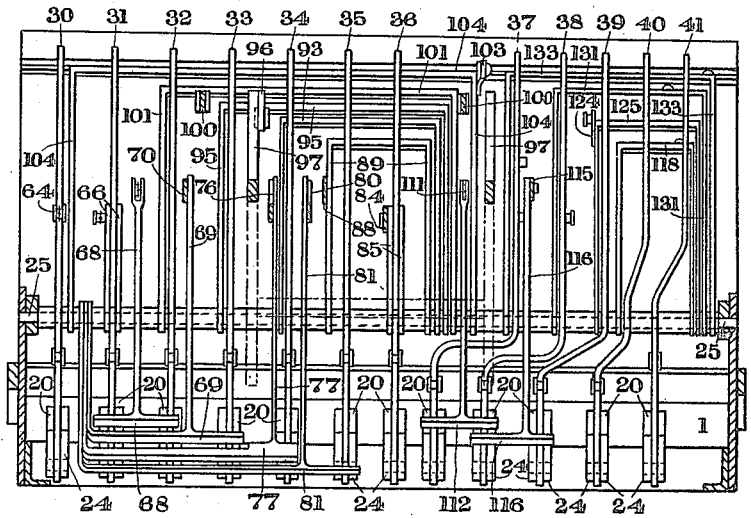
Figure 5 is a rear sectional elevation of the machine.
Figure 6:
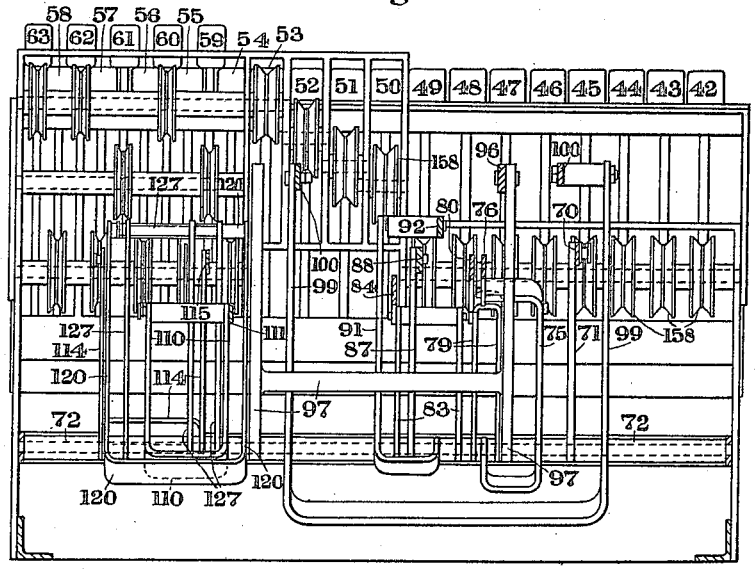
Figure 6 is a front sectional elevation of the machine.
Figure 20:
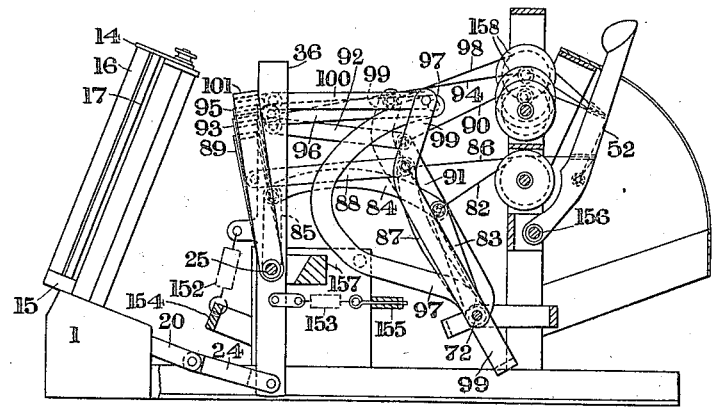
Figure 21:
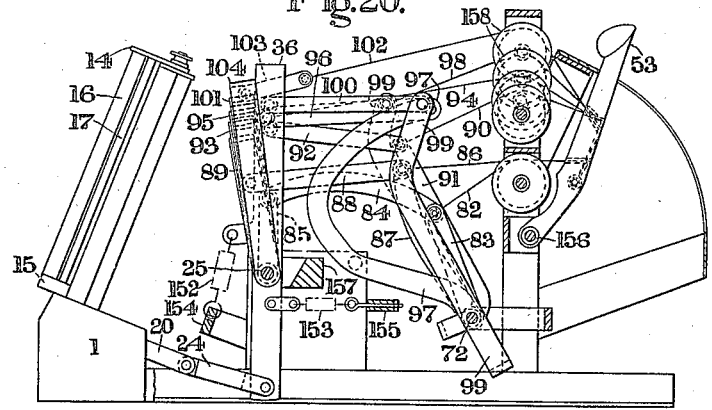
Figure 22:
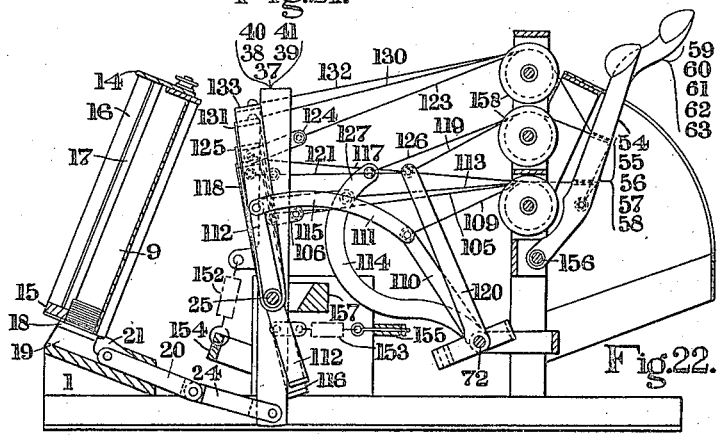

For the delivery of 9/—, Figures 4, 5, and 22, the key lever 62 is connected by a wire 130 to a yoke 131, pivoting on the fulcrum rod 25, and resting against the ejector levers 41, 40, 39, 38, so that on depression of the key lever 62, the ejectors 41, 40, 39, 38 are rocked simultaneously and, through their ejectors 20, eject a 2/6 piece from each of the coin chutes 13 and 12, and a 2/— piece from each of the coin chutes 11 and 10.

For the delivery of 10/—, Figures 4, 5, and 22, the key lever 63 is connected by a wire 132 to a yoke 133, pivoting on the fulcrum rod 25, and resting against the ejector levers 41, 40, 39, 38, 37, the depression of the key lever 63 causing the levers 41, 40, 39, 38, 37 to rock simultaneously and, through their ejectors 20, to eject a 2/6 piece from each of the coin chutes 13 and 12, a 2/— piece from each of the coin chutes 11 and 10 and a 1/— piece from the coin chute 9.

It will be obvious from the foregoing description that by depression several key levers in quick succession the delivery of change equal to a sum of several of the values above described may be effected, for example, for the delivery of 19/11½d., it is necessary to actuate the key lever 63 to obtain 10/—; the key lever 62 to obtain 9/—; the key lever 53 to obtain 11d.; and finally to actuate the key lever 42 to obtain the ½d.

Although the machine has only been described and shown with reference to the coinage of Great Britain, yet it is to be readily understood that by altering the number of key levers, ejector levers and ejectors, and the number of coin chutes, the machine is equally applicable for use with other systems of coinage.

We claim:

1. A coin delivery machine comprising in combination, a row of coin chutes, each having a reciprocatory coin ejector at the base thereof, a row of substantially upright ejector levers behind the coin chutes, each lever being operatively connected to one of said coin ejectors, a row of key levers pivotally mounted adjacent said ejector levers, a number of pivoted yokes for actuating some of said ejector levers, some of said yokes engaging said levers below the pivot and others of said yokes engaging said levers above the pivots, means connecting some of said key levers to said yokes, and means connecting the remainder of said key levers directly to some of said ejector levers, substantially as and for the purpose hereinbefore set forth.

2. A coin delivery machine comprising in combination, a row of coin chutes, each having a reciprocatory coin ejector at the base thereof, a row of substantially upright ejector levers behind the coin chutes, each lever being operatively connected to one of said coin ejectors, a row of key levers behind said ejector levers, a number of pivoted yokes for actuating some of said ejector levers, wires connecting some of said key levers to said yokes, and wires connecting the remainder of said key levers directly to some of said ejector levers, substantially as and for the purpose hereinbefore set forth.

3. A coin delivery machine comprising in combination a row of coin chutes, each having a reciprocatory coin ejector at the base thereof, a row of substantially upright ejector levers freely mounted on a common stationary axle behind said coin chutes, and connected to one of said coin ejectors, springs for holding said ejector levers in inoperative position, a row of key-levers behind said ejector levers, freely mounted on a common stationary axle, a number of yokes freely mounted on the same common axle as the ejector levers, some of said yokes extending above their axle in front of said ejector levers and the remainder extending below their axle and behind said ejector levers, wires connecting some of said key-levers to said yokes and wires connecting the remainder of said key levers directly to some of said ejector levers, substantially as and for the purpose hereinbefore set forth.

4. In a coin delivery machine comprising a coin chute, a coin support extending below said coin chute and having a slideway on the body thereof and a slot in the upper surface thereof, communicating with said slideways, a reciprocatory ejector completely housed in the slideway and comprising a plunger fitting its slideway, a pawl pivoted on the forward end of said plunger having a tooth adapted to project through the slot in said coin support, said pawl having an inclined tail portion to bear upon the plunger in the operative movement of the pawl and limit the position of the tooth, a spring located in a hole in said plunger for the purpose of holding said pawl with its tooth erect during the forward stroke of said ejector and, during the return stroke of said ejector, allowing said pawl to pivot and return with its tooth lightly rubbing on the under surface of the lowermost coin in the coin chute, substantially as and for the purpose hereinbefore set forth.

5. In a coin delivery machine comprising a coin chute having a coin support and a reciprocatory coin ejector at the base thereof, a coin ejector for said coin chute comprising a plunger, a spring pressed pawl pivoted on said plunger and adapted during the forward stroke of the ejector to engage with the lowermost coin in the chute to eject the same and to allow the pile of coins above to tilt, said pawl being also adapted during the return stroke of said ejector to pivot and rub lightly on the underside of the coin above it, substantially as and for the purpose hereinbefore set forth.

6. In a coin delivery machine comprising a coin chute having a coin support and a reciprocatory coin ejector at the base thereof, a coin ejector for the coin chute comprising a plunger having a slot in its forward end, a pawl pivoted in said slot and having a tooth on its upper part, a spring located in said plunger for holding said pawl with its tooth erect, and a rearwardly sloping tail on said pawl extending over the top of said plunger for limiting the movement of said pawl under the action of said spring, substantially as and for the purpose hereinbefore set forth.

7. A coin delivery means, including a plurality of coin chutes, a coin ejector cooperating with each chute, an upright pivotally mounted lever connected to each ejector, means for normally maintaining the levers in upright position, yokes cooperating with certain of the levers above the pivots, other yokes cooperating with certain of the levers below the pivots, and means for selectively operating the yokes.

In testimony whereof we have signed our names to this specification in the presence of two subscribing witnesses.

JAMES FREDERICK SOUTHGATE.
WALTER CAREY.

Witnesses:
B. CLARK,
S. W. SLAUGHTER.